United States Patent [19]

Pruett et al.

[11] Patent Number: 5,124,388
[45] Date of Patent: Jun. 23, 1992

[54] FILMS AND CONTAINERS OF HEAT RESISTANT COPOLYESTERS

[75] Inventors: Wayne P. Pruett, Kingsport; Charles W. Ramsey, Blountville; Sarah J. Webb, Gray; Joey C. Carico, Kingsport, all of Tenn.

[73] Assignee: Eastman Kodak Company, Rochester, N.Y.

[21] Appl. No.: 520,691

[22] Filed: May 7, 1990

[51] Int. Cl.$^5$ .............. B65D 81/02; B32B 15/08; C08K 5/13

[52] U.S. Cl. ............... 524/343; 428/458; 524/100; 524/101; 524/291; 524/333; 524/344; 524/349; 524/350; 524/351

[58] Field of Search ............... 524/291, 343, 344, 349, 524/350, 351, 333, 222, 100, 101; 428/458

[56] References Cited

U.S. PATENT DOCUMENTS

| | | | |
|---|---|---|---|
| 2,901,460 | 8/1959 | Boldebuck | 260/46.5 |
| 2,901,466 | 8/1959 | Kibler et al. | 260/75 |
| 3,033,822 | 5/1962 | Kibler et al. | 260/47 |
| 3,305,604 | 2/1967 | Armstrong et al. | 260/860 |
| 3,516,957 | 6/1970 | Gray et al. | 528/307 |
| 4,233,207 | 11/1980 | Spivack | 524/126 |
| 4,259,478 | 3/1981 | Jackson et al. | 524/307 |
| 4,322,003 | 3/1982 | Long | 428/458 |
| 4,360,617 | 11/1982 | Muller et al. | 524/153 |
| 4,362,775 | 12/1982 | Yabe et al. | 428/458 |
| 4,699,942 | 10/1987 | Weaver et al. | 524/333 |
| 4,859,732 | 8/1989 | Minnick | 524/385 |
| 4,972,015 | 11/1990 | Carico et al. | 524/303 |

FOREIGN PATENT DOCUMENTS

WO88/01285 2/1988 PCT Int'l Appl. .

*Primary Examiner*—Veronica P. Hoke
*Attorney, Agent, or Firm*—John F. Stevens; William P. Heath, Jr.

[57] ABSTRACT

Disclosed are films, containers and container liners comprising a copolyester having repeat units from terephthalic acid and 1,4-cyclohexanedimethanol, and a hindered phenolic antioxidant.

13 Claims, No Drawings

FILMS AND CONTAINERS OF HEAT RESISTANT COPOLYESTERS

TECHNICAL FIELD

This invention relates to films and containers of copolyesters having repeat units from terephthalic acid and 1,4-cyclohexanedimethanol which have improved dimensional stability, flexibility and resistance to discoloration when subjected to temperatures as high as 450° F. for periods of at least an hour.

Background of the Invention

There is presently a need for ovenable food containers capable of withstanding high temperatures. Most conventional home ovens are calibrated to only about ±50° F., and may reach temperature during use of up to about 450° F. It is desirable that the containers do not lose impact strength, dimensional stability under the influence of these temperatures. There is a particular need for films to be used as lidding material for containers which will remain peelable after cooking in an oven at temperatures of around 450° F. Also, metallized susceptor films should not be brittle when subjected to these temperatures.

Applicants have now discovered films and containers comprising a high molecular weight copolyester having high tensile strength, yet having the ability to retain its flexibility, impact resistance and dimensional stability when subjected to high oven temperatures. In these products, it is necessary that the polyester contain repeating units from particular dicarboxylic acid(s) and a particular glycol, and have a high inherent viscosity indicating high molecular weight. It is also necessary that the article contain a heat stabilizer which will prevent brittleness when subjected to high oven temperatures.

This invention provides a high molecular weight copolyester containing repeating units from terephthalic acid and 1,4-cyclohexanedimethanol for use in thin film for high temperature exposure. The unique properties of this copolyester provide excellent dimensional stability of a thin substantially amorphous film when exposed to oven temperatures in the range of 450° F.

Presently, oriented, heat-set, poly(ethylene terephthalate) [PET] is being used in thin film lidding applications and inner layers of containers such as bags. Production of this type PET film requires expensive orientation equipment and its operation and maintenance. This invention describes a material which has equivalent or superior high temperature properties as existing commercial products and can be converted by less costly methods.

PET is extruded into a film followed by a subsequent orientation and heatsetting operation. The orientation improves the physical properties of the film (i.e. yield and break strength, modulus, barrier properties). Heatsetting of the film helps maintain these improved properties when exposed to the elevated temperatures.

U.S. Pat. No. 2,901,466 is directed to linear polyesters and polyester-amides from 1,4-cyclohexanedimethanol. Example 57 discloses polyesters having repeat units from terephthalic acid, isophthalic acid and 1,4-cyclohexanedimethanol. This patent recognizes the high melting points and improved stability, as well as other properties, of these polymers compared to PET. However, this patent indicates that films of these polymers should be oriented and heat set (Col. 7 and Example 55). Possibly this is because hindered phenolic antioxidants are not used to improve heat resistance. Also of interest is U.S. Pat. No. 3,033,822 which relates to linear polyesters of 1,4-cyclohexanedimethanol and hydroxycarboxylic acids where it is also recognized that these polymers have high melting temperatures, hydrolytic stability, etc.

It is also conventional in the art to use hindered phenolic antioxidants with various polymers as antioxidants. See, for example, U.S. Pat. No. 4,859,732.

Applicants have now discovered that films and containers of particular copolyesters of terephthalic acids and minor amounts of other acids such as isophthalic acid with 1,4-cyclohexanedimethanol, when used in a substantially nonoriented and substantially amorphous condition and mixed with hindered phenolic antioxidants, exhibit many desirable properties when used in high temperature applications.

DISCLOSURE OF THE INVENTION

According to the present invention, there is provided a substantially amorphous and substantially nonoriented film having improved dimensional stability, flexibility and resistance to discoloration when subjected to temperatures of 450° F. for 60 minutes, the film comprising a copolyester having repeat units from at least 80 mol % terephthalic acid and at least 90 mol % 1,4-cyclohexanedimethanol, the copolyester having an I.V. of about 0.7-1.1, and a stabilizing amount of a hindered phenolic antioxidant. Preferably, the film is about 0.5-2.5 mil thick.

Also, according to the present invention there are provided containers having a body and a lid, the lid of which comprises the film described above. Further, there are provided containers (e.g., bags) having a body portion which includes at least one layer of film described above. The film may be used also as a susceptor film. For example, microwave ovens use high frequency radiation to agitate the food molecules. Under these circumstances, the food does not usually exceed temperatures of 250° F. In order to brown or crisp the food, an external heat source is used to provide the elevated temperature needed. Quite often, metallized susceptor films are used. In such metallized films, a thin coating of a metal such as aluminum or aluminum alloy is applied to a surface of the film by conventional means such as vacuum or sputter coating. The presence of the metal provides increased heating capacity of the film. The metal molecules absorb microwave energy and become agitated, creating radiant energy, and subsequently radiant heat. This radiant heat exposure is similar to pan frying and causes the surface of the food to fry or become crisp. Microwave susceptor films may reach temperatures of 450° F. or greater. Oriented PET films used as susceptor films at these temperatures are known to degrade and become brittle which will allow undesirable migration of packaging components into the food.

This material has also shown to have a lower level of low molecular weight extractibles than PET at elevated cooking temperatures and can pass more stringent pending FDA regulations.

This film can be coated with a heat sealable material for sealing to plastic blister packages, plastic or pulp trays, cups or other containers, or other film substrates. The heat sealable coating is either a solvent based adhesive or a copolyester having heat sealing characteristics. Seals of the film to containers provide tamper-evidence, moderate barrier properties, and maintenance of package sterility. Sealing of the film to a container can be made in a continuous form-fill-seal operation or in separate process steps. Heat seals are made by use of specific combinations of time, temperature, pressure, and sealing surface. Other means of sealing such as radio frequency and ultrasonic can also be used. This film can be used to serve as a dust cover to food and is not necessarily sealed to the container.

Improved dimensional stability includes less shrinkage, and a reduction of cracking and brittleness. Oriented PET will shrink and/or distort to relieve stresses when exposed to temperatures above its heat set temperature. When used in susceptor applications, cracking of this less stable film allows adhesive and paper components to migrate to the food product. When used as a lidding after lengthy exposure to high temperatures in convection ovens, brittleness experienced with this film will prevent a clean unbroken peelable lidding film. These problems are reduced or eliminated with the stabilized films of this invention.

The copolyesters used in making the articles of this invention have 100 mol % of a dicarboxylic acid portion and 100 mol % of a glycol portion. The dicarboxylic acid portion of the copolyesters comprise repeat units from at least 80 mol % terephthalic acid. Up to about 20 mol % of the dicarboxylic acid repeat units may be from acids selected from succinic, glutaric, adipic, azelaic, sebacic, fumaric, maleic, itaconic, 1,4-cyclohexanedicarboxylic, phthalic, isophthalic, and naphthalene dicarboxylic acid. Preferably, the dicarboxylic acid component contains repeat units from about 2-20 mol % isophthalic acid, and most preferably about 2-10 mol % isophthalic acid.

The glycol component of the copolyesters contain repeat units from at least 90 mol % 1,4-cyclohexanedimethanol. The glycol component may include up to about 10 mol % of conventional glycols such as ethylene glycol, propylene glycol, 1,3-propanediol; 2,4-dimethyl-2-ethylhexane-1,3-diol, 2,2-dimethyl-1,3-propanediol, 2-ethyl-2-butyl-1,3-propanediol, 2.ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

The copolyesters may be produced using conventional polyesterification procedures described, for example, in U.S. Pat. Nos. 3,305,604 and 2,901,460 the disclosures of which are incorporated herein by reference. Of course, esters of the acids (e.g., dimethyl terephthalate) may be used in producing the polyesters. It is also very desirable in the present invention for the I.V. of the polyester to be high, i.e., in the range of about 0.87-1.1. Preferably, the high I.V.'s are attained by melt phase polymerization followed by conventional solid state polymerization.

The copolyesters described herein have high melting temperatures, but they tend to oxidize at the high temperatures which may be encountered by food trays. Thus, it is necessary to include a heat stabilizing amount of a hindered phenol antioxidant in the thermoforming compositions.

Hindered phenol antioxidants are commercially available. One suitable hindered phenol is Irganox 1010 antioxidant, marketed by Ciba-Geigy. Its chemical name is tetrakis[methylene-3-(3',5,-di-tert-butyl-4'-hydroxyphenyl)propionate] methane. These hindered phenols have the general formula

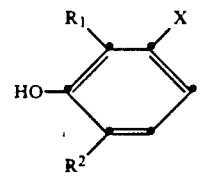

wherein $R_1$ is a branched alkyl group containing 3-20 carbon atoms, $R_2$ is H or a straight or branched alkyl group containing 1 to 20 carbon atoms, and X is an alkyl group or an electron donating group.

Other hindered phenols useful in the present invention include 1,3,5-tris(3,5-di-tert-butyl-4-hydroxybenzyl)-5-triazine-2,4,6-(1H, 3H, 5H)trione; 3,5-di-tert-butyl-4-hydroxyhydrocinnamic acid triester with 1,3,5-tris(2-hydroxyethyl)-S-triazine-2,4,6-(1H, 3H, 5H)-trione; octadecyl 3,5-di-tert-butyl-4-hydroxyhydrocinnamate; thiodiethylene bis(3,5-di-tert-butyl-4-hydroxy)-hydrocinnamate; N,N'-hexamethylene bis(3,5-di-tert-butyl-4-hydroxy-hydrocinnamamide); 1,6-hexamethylene bis(3,5-di-tert-butyl-4-hydroxyhydrocinnamate); 1,3,5-trimethyl-2,4,6,-tris(3,5-di-tert-butyl-4-hydroxybenzyl)benzene; 2,4-bis(n-octylthio)-6-(4-hydroxy-3,5-di-tert-butylanilino)-1,3,5-triazine; n-octadecyl 3,5-di-tert-butyl-4-hydroxyphenylacetate; 1,3,5-tris(4-tert-butyl-3-hydroxy-2,6-dimethylbenzyl)-1,3,5-triazine-2,4,6-(1H, 3H, 5H)trione; 2,2'-methylene-bis(4-ethyl-6-tert-butylphenol); 2,2'-methylenebis (4-methyl-6-tert-butylphenol); 4,4'-methylenebis (2,6-di-tert-butylphenol); 4,4'-thioibis(6-tert-butyl-o-cresol); 3:1 condensate of 3-methyl-6-tert-butylphenol and crotonaldehyde; 4,4'-butyldienebis(6-tert-butyl-m-cresol)3,5-di-tert-butyl-4-hydooxybenzyl ether; 2,2'-oxamidobis ethyl-3(3,5-di-tert-butyl-4-hydroxyphenyl)propionate; stearyl β-3,5-di.tert-butyl-4-hydroxyphenyl)propionate; distearyl 3-methyl-4-hydroxy-5-tert-butylbenzyl malonate; 4,4'-propyl-methylenebis (2-tert-butyl-5-methylphenol); 2,2'-propylmethylenebis (4,6-dimethylphenol); 2,2'-methylenebis(4,6'-di-tert-butylphenol); 1,4-bis(3',5'-ditert-butyl-4'-hydroxybenzyl)-2,3,5,6-tetramethylbenzene; 1,1-bis(3'-cyclohexyl-4'-hydroxyphenyl)cyclohexane; 2,6-bis(2'-hydroxy-3'-tert-butyl-5'-methylphenyl)-4-methylphenol; 2,4,6-tris((β-(3',5'-di-butyl-4'-hydroxyphenyl)ethyl)-1,3,5-triazine; 2,4,6-tris(3',5,-di-tert-butyl-4'-hydroxybenzyl)phenol.

Other conventional antioxidants may be used with the hindered phenol. For example, thio esters and thio ethers, as well as phosphorous compounds such as phosphite and phosphonite antioxidants and phosphate salts such as $CaHPO_4$ and $Na_2HPO_4$.

The useful thio ethers and thio esters include esters of thiodipropionic acid, preferably dilauryl thiodipropionate and distearyl thiodipropionate.

The useful phosphite compounds are described as organophosphorus compounds selected from the group consisting of alkyl, aryl and alkyl substituted aryl phosphites and phosphonites, wherein the alkyl andaryl groups contain 6-30 carbon atoms and the alkyl substituted aryl groups containing 7-30 carbon atoms.

The terms "phosphite" and "phosphonite" as used herein are intended to include diphosphite and diphosphonite.

Examples of phosphorus compounds useful in the present inventions are: tetra(2″,4″-di-tert-butylphenyl) diphenyl-4,4′-enediphosphite, diphenyl phosphite, tristearyl phosphite, diphenyl isooctyl phosphite, trisnonylphenyl phosphite, and bis(2,4-di-t-butylphenyl) pentaerythritol diphosphite and distearyl pentaerythritol diphosphite and the like.

Preferably, the hindered phenol is used in amounts of about 0.05-2% based on the weight of the article. Phosphite and thiodipropionate may each be present in amounts of up to about 1.0% based on the weight of the article. These antioxidants may be added to the polyester separately or as a mixture.

Other conventional additives such as pigments, dyes, plasticizers, various stabilizers, etc., may be used as desired.

The film can be made by any conventional method, the most common method being by extrusion through a flat die. It is important that the sheet or film be quenched immediately after extrusion in order to minimize the extent of crystallization developed after forming.

The term "substantially nonoriented" is intended to mean there is no orientation other than that which may be inherent from the extrusion process.

Containers having a body and a lid in accordance with this invention may be produced by conventional techniques. For example, a container having a body such as a tray, cup, etc. of a material such as the same or different copolymer as the lid, another polymeric material, paper, etc. may have the lid as described herein applied to the rim at the top by means such as using a conventional adhesive or heat sealing.

Containers comprising a body portion having at least one layer of a copolyester described herein may be made by conventional means. For example, bags such as popcorn bags may be produced. Normally, such bags would have two or more layers wherein one layer is the copolyester and antioxidant described herein laminated to another layer of a material such as paper or another polymeric material. In such cases, the copolyester/antioxidant layer would be on the inside contacting the contents.

The following examples are submitted for a better understanding of the invention. In Examples 1-5 the copolyester has repeat units from about 90 mol % terephthalic acid, about 10 mol % isophthalic acid and 100 mol % 1,4-cyclohexanedimethanol. In comparative Example 6, the polymer is oriented poly(ethylene terephthalate).

The thin films in the examples are prepared using copolyesters with an inherent viscosity of 0.95. Samples containing stabilizers are produced by first preparing a stabilizer concentrate using polypropylene or copolyester polymers as the base polymer for the concentrate. The concentrate is then blended (pellet to pellet) with the copolyester described above (about 90 mol % terephthalic acid, about 10 mol % isophthalic acid and about 100 mol % 1,4-cyclohexanedimethanol) and thin film are extruded using a conventional film extruder. The films are then compared to commercial oriented and heat set PET film.

| Example | Formulation | 0 Min. Color | 0 Min. Rating | Oven Aged at 450° F. 30 Min. Color | 30 Min. Rating | 60 Min. Color | 60 Min. Rating |
|---|---|---|---|---|---|---|---|
| 1 | Copolyester Control | 1 | P | 1 | F | 5 | F |
| 2 | Copolyester + 0.5% Ethanox 330 Stabilizer | 1 | P | 3 | P | 3 | P |
| 3 | Copolyester + 0.1% Ethanox 330 Stabilizer + 0.3% DSTDP* | 1 | P | 2 | P | 2 | P |
| 4 | Copolyester + 0.1% Ethanox 330 Stabilizer + 0.3% DSTDP* + 0.04% Na₂HPO₄ | 1 | P | 2 | P | 2 | P |
| 5 | Copolyester + 0.5% Ethanox 330 Stabilizer | 1 | P | 3 | P | 3 | P |
| 6 | Polyester (PET) | 1 | P | 1 | P | 1 | F |

All films ranged in thickness from 0.5-2.0 mils.
P = Pass; film remained ductile
F = Fail; film became brittle
Color Scale:
1 = best
5 = worst
*DSTDP = distearyl thiodipropionate Theses examples show that amorphous nonoriented copolyester film has an advantage over oriented, heatset PET film after oven aging at 450° F. The addition of the phosphorus compound and/or the thio compound in combination with the hindered phenol also slightly improves the color retention. The dimensional stability of the nonoriented copolyester films was also better than the oriented PET film. After aging for 60 minutes at 450° F. the copolyester films had <5% shrinkage, whereas the PET film shrank >15%.

In the aging tests, films of the compositions (0.5-2.0 mils) are aged for the indicated time in an oven at 450° F. The color test is a subjective test whereby a rating of 1-5 is used; 1 indicates the best, or least amount of discoloration, while 5 indicates the worst, or greatest amount of discoloration.

The bending tests referred to herein are used to distinguish between ductile and brittle samples. The polymer is blended with the necessary additives (stabilizers, etc.) and then extruded into films. Samples are cut 3″ wide and 3″ long for each test. The samples are aged in an oven (air-circulating) which is preheated to the desired temperature. The samples are removed from the oven and allowed to cool to 73° F. The film samples are then evaluated for brittleness by bending. They are bent 180° and creased about every ½ inch along the 3-inch length of the sample. They are rated as follows:

Brittle if any bends/creases fracture
Ductile if all bends/creases do not break

As used herein, brittle failure means breaking due to brittleness.

Whenever the term "inherent viscosity" (I.V.) is used in this application, it will be understood to refer to viscosity determinations made at 25° C using 0.5 gram of polymer per 100 ml of a solvent composed of 60 wt % phenol and 40 wt % tetrachloroethane.

Materials referred to by trademark are described as follows:

Ethanox 330 - 1,3,5-trimethyl-2,4,6-tris(3,5-di-t-butyl-4-hydroxybenzyl)benzene

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A substantially amorphous and substantially nonoriented film having improved dimensional stability, flexibility and resistance to discoloration when subjected to temperatures of 450° F. for at least 60 minutes, said film having a thickness of less than 2.5 mils and comprising a copolyester having repeat units from at least 80 mol % terephthalic acid and at least 90 mol % 1,4-cyclohexanedimethanol, said copolyester having an I.V. of about 0.7–1.1, and a stabilizing amount of a hindered phenolic antioxidant.

2. The film according to claim 1 having a metallic coating on a surface thereof.

3. The film according to claim 1 comprising a copolyester having repeat units from at least 80 mol % terephthalic acid and up to about 20 mol % of an acid selected from succinic, glutaric, adipic, azelaic, sebacic, fumaric, maleic, itaconic, 1,4-cyclohexanedicarboxylic, phthalic, isophthalic, and naphthalene dicarboxylic acid, and at least 90 mol % 1,4-cyclohexanedimethanol.

4. The film according to claim 3 wherein said copolyesters have repeat units from about 80–98 mol % terephthalic acid and about 20–2 mol % isophthalic acid.

5. A container comprising a body and a lid, said lid being a substantially amorphous and substantially nonoriented film having improved dimensional stability, flexibility and resistance to discoloration when subjected to temperatures of 450° F. for at least 60 minutes, said film having a thickness of less than 2.5 mils and comprising a copolyester having repeat units from at least 80 mol % terephthalic acid and at least 90 mol % 1,4-cyclohexanedimethanol, said copolyester having an I.V. of about 0.7–1.1, and a stabilizing amount of a hindered phenolic antioxidant.

6. The container according to claim 5 comprising a copolyester having repeat units from at least 80 mol % terephthalic acid and up to about 20 mol % of an acid selected from succinic, glutaric, adipic, azelaic, sebacic, fumaric, maleic, itaconic, 1,4-cyclohexanedicarboxylic, phthalic, isophthalic, and naphthalene dicarboxylic acid, and at least 90 mol % 1,4-cyclohexanedimethanol.

7. The container according to claim 6 wherein said copolyester has repeat units from about 80–98 mol % terephthalic acid and about 20–2 mol % isophthalic acid.

8. A container comprising a body portion having at least one layer of a substantially amorphous and substantially nonoriented film having improved dimensional stability, flexibility and resistance to discoloration when subjected to temperatures of 450° F. for at least 60 minutes, said film having a thickness of less than 2.5 mils and comprising a copolyester having repeat units from at least 80 mol % terephthalic acid and at least 90 mol % 1,4-cyclohexanedimethanol, said copolyester having an I.V. of about 0.7–1.1, and a stabilizing amount of a hindered phenolic antioxidant.

9. A container according to claim 8 wherein said layer has a metallic coating on a surface thereof.

10. The container according to claim 8 comprising a copolyester having repeat units from at least 80 mol % terephthalic acid and up to about 20 mol % of an acid selected from succinic, glutaric, adipic, azelaic, sebacic, fumaric, maleic, itaconic, 1,4-cyclohexanedicarboxylic, phthalic, isophthalic, and naphthalene dicarboxylic acid, and at least 90 mol % 1,4-cyclohexanedimethanol.

11. The container according to claim 10 wherein said copolyester has repeat units from about 80–98 mol % terephthalic acid and about 20–2 mol % isophthalic acid.

12. A container liner comprising the film of claim 1.

13. A container liner according to claim 10 having a metallic coating thereon.

* * * * *